(12) United States Patent
Fukumura et al.

(10) Patent No.: US 7,884,574 B2
(45) Date of Patent: Feb. 8, 2011

(54) HYBRID VEHICLE AND CONTROL METHOD THEREFOR

(75) Inventors: Mitsumasa Fukumura, Susono (JP); Takashi Kawai, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 413 days.

(21) Appl. No.: 12/223,125

(22) PCT Filed: Feb. 22, 2007

(86) PCT No.: PCT/JP2007/053867

§ 371 (c)(1), (2), (4) Date: Jul. 23, 2008

(87) PCT Pub. No.: WO2007/097471

PCT Pub. Date: Aug. 30, 2007

(65) Prior Publication Data

US 2009/0015201 A1 Jan. 15, 2009

(30) Foreign Application Priority Data

Feb. 23, 2006 (JP) .............................. 2006-046939

(51) Int. Cl.
*H02J 7/00* (2006.01)

(52) U.S. Cl. ................... 320/130; 320/104; 318/139

(58) Field of Classification Search ................. 320/130
See application file for complete search history.

(56) References Cited

U.S. PATENT DOCUMENTS

| | | | | |
|---|---|---|---|---|
| 4,689,531 A | * | 8/1987 | Bacon | .................. 318/139 |
| 5,984,033 A | * | 11/1999 | Tamagawa et al. | ....... 180/65.28 |
| 6,131,680 A | * | 10/2000 | Nii et al. | ................. 180/65.235 |
| 6,158,541 A | | 12/2000 | Tabata et al. | |
| 6,225,784 B1 | * | 5/2001 | Kinoshita et al. | ........... 320/132 |
| 6,338,391 B1 | * | 1/2002 | Severinsky et al. | ........ 180/65.23 |
| 7,420,295 B2 | * | 9/2008 | Omae et al. | .................... 307/66 |
| 7,489,048 B2 | * | 2/2009 | King et al. | .................. 307/10.1 |
| 2001/0026142 A1 | * | 10/2001 | Furukawa et al. | ........... 320/103 |
| 2002/0147070 A1 | * | 10/2002 | Izumiura et al. | ................ 477/4 |
| 2005/0106424 A1 | * | 5/2005 | Elhamid et al. | ................. 429/9 |
| 2006/0164034 A1 | * | 7/2006 | Hanyu et al. | .................. 320/104 |
| 2008/0067973 A1 | * | 3/2008 | Ishikawa et al. | ............. 320/104 |

FOREIGN PATENT DOCUMENTS

| | | |
|---|---|---|
| JP | A-08-205304 | 8/1996 |
| JP | A-08-214592 | 8/1996 |
| JP | A-10-290532 | 10/1998 |
| JP | A-2001-119802 | 4/2001 |
| JP | A-2003-031267 | 1/2003 |
| JP | A-2003-217678 | 7/2003 |
| JP | A-2004-166350 | 6/2004 |
| JP | A-2004-166416 | 6/2004 |
| JP | A-2004-328906 | 11/2004 |

\* cited by examiner

*Primary Examiner*—Edward Tso
*Assistant Examiner*—Arun Williams
(74) *Attorney, Agent, or Firm*—Oliff & Berridge, PLC

(57) ABSTRACT

An HV-ECU executes refresh-discharging of a battery before the battery is charged from a commercial power source using an AC/DC converter. After the battery is refresh-discharged, the HV-ECU outputs a control signal to the AC/DC converter such that the battery is charged from the commercial power source by the drive of the AC/DC converter.

13 Claims, 7 Drawing Sheets

AUXILIARY DEVICE
ELECTRICAL POWER

HYBRID VEHICLE AND CONTROL METHOD THEREFOR

TECHNICAL FIELD

The present invention relates to a hybrid vehicle and a control method therefor, particularly to refresh control of a battery incorporated in a hybrid vehicle.

BACKGROUND ART

In view of the recent increasing concern about energy saving and environmental problems, great attention is focused on hybrid vehicles. A hybrid vehicle employs a battery, an inverter, and a motor driven by the inverter, as well as a conventional engine, as the motive power source. In addition to obtaining motive energy by driving the engine, the voltage from the battery is converted into alternating voltage by the inverter, and the motor is rotated by the converted alternating voltage to obtain further motive energy.

In such a hybrid vehicle, the charge and discharge of a battery is controlled such that the amount of charge indicating the state of charge (SOC) of the battery (hereinafter, also simply referred to as "SOC"; represented by 0 to 100%) falls within a predetermined range.

It is known that such battery charging and discharging within a predetermined range will cause an error between the SOC estimated value and the actual SOC, reduction in the charging/discharging capacitance by the so-called memory effect, degradation by sulfation, and the like. These problems can be solved by carrying out the so-called refresh on the battery. In other words, these problems can be eliminated by achieving substantially a fully-charged or fully-discharged state of the battery. It is known that the refresh effect is increased by charging or discharging the battery such that the SOC greatly deviates from the control range.

Japanese Patent Laying-Open No. 2004-328906 discloses a charging control apparatus for a hybrid vehicle that carries out such battery refresh. In this charging control apparatus, the continuous operating time of the engine is calculated based on the vehicle state. Furthermore, the time required for refresh-charging the battery is calculated. Refresh-charging of the battery is effected when determination is made that the engine continuous operation time is longer than said time required for charging.

Since refresh charging is completed before or simultaneous to the elapse of the engine continuous operation time by the charging control apparatus, the engine will not be driven just for the purpose of refresh-charge. As a result, reduction in mileage can be suppressed.

However, the charging control apparatus disclosed in Japanese Patent Laying-Open No. 2004-328906 is disadvantageous in that fuel consumption by the engine is encountered since the generator is driven by the engine to carry out refresh-charging of the battery.

Particularly in a hybrid vehicle that can have the battery charged by means of a power source external to the vehicle, the SOC control range will become higher than that of a hybrid vehicle absent of an external charging function. There is a possibility that sufficient refresh effect cannot be achieved even if refresh-charging is carried out.

DISCLOSURE OF THE INVENTION

In view of the foregoing, an object of the present invention is to provide a hybrid vehicle that can have a battery refreshed reliably and efficiently.

Another object of the present invention is to provide a control method for a hybrid vehicle that can have a battery refreshed reliably and efficiently.

According to the present invention, a hybrid vehicle includes an internal combustion engine, a first electric motor, a battery that can be charged and discharged, a power generation device, an electrical power conversion device, and a control device. The internal combustion engine and the first electric motor are incorporated as the motive energy source for the vehicle. The battery constitutes the power source for the first electric motor. The power generation device generates electrical power using the motive energy from the internal combustion engine and can charge the battery. The electrical power conversion device conducts electrical power conversion such that electrical power can be transmitted and received between a power source external to the vehicle and the battery. The control device controls the electrical power conversion device such that refresh-discharging of the battery is executed prior to charging the battery from an external power source using the electrical power conversion device, and that the battery is charged from the external power source after the battery has been refresh-discharged.

Preferably, the power generation device includes a second electric motor. The second electric motor has a rotational shaft mechanically coupled to a crankshaft of the internal combustion engine, and can start the internal combustion engine using the electrical power from the battery. The control device determines that refresh-discharging is to be executed when the remaining amount of fuel in the internal combustion engine exceeds a prescribed amount. As used herein, the prescribed amount is the amount that allows the internal combustion engine to be operated continuously during the period when a state of charge indicating the battery charge state is lower than a required amount required to start the internal combustion engine by the second electric motor in accordance with refresh-discharging.

Further preferably, the control device controls the second electric motor such that the internal combustion engine is started before the state of charge becomes lower than the required amount in accordance with refresh-discharging, and controls the internal combustion engine such that the internal combustion engine is continuously operated during the period when the state of charge is lower than the required amount.

Preferably, the control device determines whether the external power source is stable or not, and determines that refresh-discharging is to be executed when determination is made that the external power source is stable.

Preferably, the power generation device includes a second electric motor. The second electric motor has a rotational shaft mechanically coupled to a crankshaft of the internal combustion engine, and can start the internal combustion engine using the electrical power from the battery. The control device determines whether the external power source is stable or not, and controls the second electric motor such that the internal combustion engine is started when determination is made that the external power source is unstable.

Preferably, the hybrid vehicle further includes an input device. The input device allows the user to designate execution of refresh-discharging. The control device determines that refresh-discharging is to be executed when execution of refresh-discharging is designated through the input device.

Further preferably, the hybrid vehicle further includes an input device. The input device allows the user to designate whether the internal combustion engine is to be operated or not in accordance with refresh-discharging. The power generation device includes a second electric motor. The second electric motor has a rotational shaft mechanically coupled to a crankshaft of the internal combustion engine, and can start the internal combustion engine using electrical power from the battery. The control device controls the second electric motor such that the internal combustion engine is started in accordance with refresh-discharging when operation of the internal combustion engine is designated through the input device.

Preferably, the control device controls the electrical power conversion device such that the electrical power discharged from the battery is supplied to the external power source.

Preferably, the hybrid vehicle further includes a notification device. The notification device notifies the user that the battery is currently charging/discharging in accordance with refresh-discharging.

Further preferably, the hybrid vehicle further includes a notification device. The notification device notifies the user that the internal combustion engine is currently operating in accordance with refresh-discharging.

According to the present invention, a control method is directed to a control method for a hybrid vehicle. The hybrid vehicle includes an internal combustion engine, a first electric motor, a battery that can be charged and discharged, a power generation device, and an electrical power conversion device. The internal combustion engine and the first electric motor are incorporated as the motive energy source for the vehicle. The battery constitutes the power source for the first electric motor. The power generation device generates electrical power using the motive energy from the internal combustion engine, and can charge the battery. The electrical power conversion device conducts electrical power conversion such that electrical power can be transmitted and received between a power source external to the vehicle and the battery. The control method includes first and second steps. In the first step, refresh-discharging of the battery is executed before the battery is charged from an external power source using the electrical power conversion device. In the second step, the battery is charged from an external power source by controlling the electrical power conversion device, after the battery is refresh-discharged.

Preferably, the power generation device includes a second electric motor. The second electric motor has a rotational shaft mechanically coupled to a crankshaft of the internal combustion engine, and can start the internal combustion engine using the electrical power from the battery. The control method further includes a third step. In the third step, determination is made as to whether refresh-discharging is to be executed or not based on a remaining amount of fuel in the internal combustion engine. When determination is made that the remaining amount of fuel in the internal combustion engine exceeds a prescribed amount and refresh-discharging is to be executed in the third step, refresh-discharging of the battery is executed in the first step. As used herein, the prescribed amount is the amount that allows the internal combustion engine to be operated continuously during the period when a state of charge indicating the battery charge state is lower than a required amount required to start the internal combustion engine by the second electric motor in accordance with refresh-discharging.

Preferably, the control method further includes fourth and fifth steps. In the fourth step, the internal combustion engine is started before the state of charge becomes lower than the required amount in accordance with refresh-discharging. In the fifth step, the internal combustion engine is shut down when the state of charge exceeds the required amount in the event of the battery being charged by an external power source in the second step.

Preferably, the control method further includes a sixth step. In the sixth step, determination is made as to whether refresh-discharging is to be executed or not based on the external power source. When determination is made that the external power source is stable and refresh-discharging is to be executed in the sixth step, the refresh-discharging of the battery is executed at the first step.

Preferably, the power generation device includes a second electric motor. The second electric motor has a rotational shaft mechanically coupled to a crankshaft of the internal combustion engine, and can start the internal combustion engine using the electrical power from the battery. The control method further includes seventh and eighth steps. In the seventh step, determination is made as to whether the external power source is stable or not. In the eighth step, the internal combustion engine is started when determination is made that the external power source is unstable.

In the present invention, the control device executes refresh-discharging of the battery before the battery is charged from an external power source using the electrical power conversion device. Therefore, the battery can be refreshed reliably even in the case where the SOC control range is high. Since the control device controls the electrical power conversion device such that the battery is charged from the external power source after the battery is refresh-discharged, the battery can be charged efficiently as compared to the case where the internal combustion engine is operated to charge the battery.

According to the present invention, the battery can be refreshed reliably and efficiently.

BEST MODES FOR CARRYING OUT THE INVENTION

Figure 1:
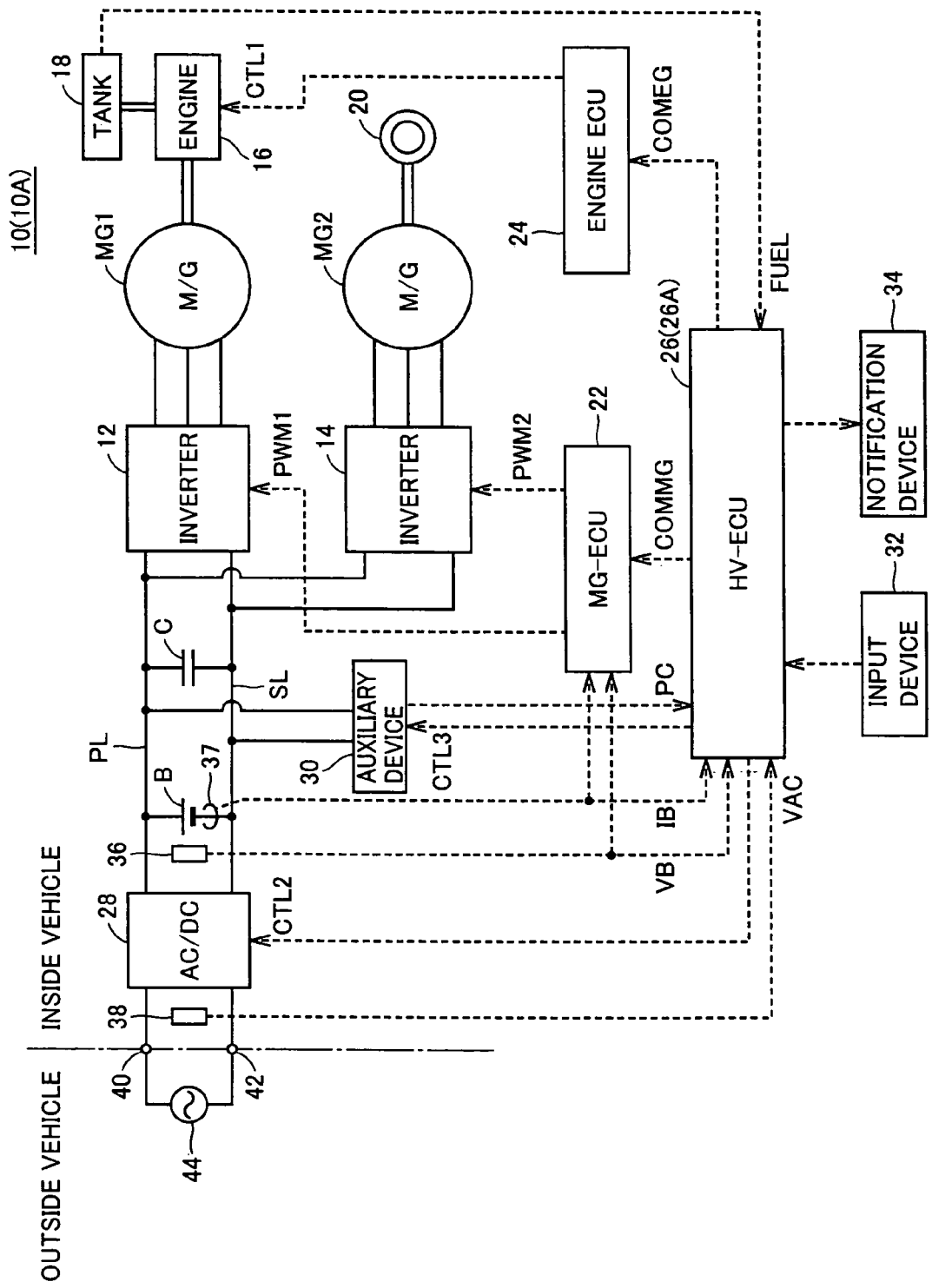
FIG. 1 is an entire block diagram of a hybrid vehicle according to a first embodiment of the present invention.

Embodiments of the present invention will be described hereinafter with reference to the drawings. In the drawings, the same or corresponding elements have the same reference characters allotted, and description thereof will not be repeated.

First Embodiment

FIG. 1 is an entire block diagram of a hybrid vehicle according to a first embodiment of the present invention. Referring to FIG. 1, a hybrid vehicle 10 includes a battery B, a power supply line PL, a ground line SL, a capacitor C, inverters 12 and 14, motor generators MG1 and MG2, an engine 16, a fuel tank 18, a driving wheel 20, an MG-ECU (Electronic Control Unit) 22, an engine ECU 24, and an HV-ECU 26, a voltage sensor 36, and a current sensor 37. Hybrid vehicle 10 further includes an AC/DC converter 28, a voltage sensor 38, terminals 40, 42, an auxiliary device 30, an input device 32, and a notification device 34.

Battery B is a battery that can be charged and discharged, formed of a secondary battery such as of nickel hydroxide, lithium ions, or the like. Battery B supplies direct current power to inverters 12 and 14 via power supply line PL and ground line SL. Battery B is charged by the electrical power generated by motor generator MG1 using the output of engine 16, and also the electrical power generated by motor generator MG2 at the time of regenerative braking of the vehicle. Battery B is also charged by the electrical power supplied from a commercial power source 44 external to the vehicle.

Voltage sensor 36 detects battery voltage VB of battery B, and provides the detected battery voltage VB to MG-ECU 22 and HV-ECU 26. Current sensor 37 detects battery current IB that is input to or output from battery B, and provides detected battery current IB to MG-ECU 22 and HV-ECU 26. Capacitor C smoothes the voltage variation between power supply line PL and ground line SL.

Inverters 12 and 14 are provided corresponding to motor generators MG1 and MG2, respectively. Inverter 12 converts the 3-phase alternating current power generated by motor generator MG1 upon receiving the motive energy of engine 16 into direct current power based on a signal PWM1 from MG-ECU 22, and supplies the converted direct current power onto power supply line PL. At the startup of engine 16, inverter 12 converts the direct current power supplied from power supply line PL into 3-phase alternating current power to drive motor generator MG1, based on signal PWM1 from MG-ECU 22.

Inverter 14 responds to a signal PWM2 from MG-ECU 22 to convert the direct current power supplied from power supply line PL into 3-phase alternating current power to drive motor generator MG2. Accordingly, motor generator MG2 is driven to generate the designated torque. In the regenerative braking mode of the vehicle, inverter 14 converts the 3-phase alternating current power generated by motor generator MG2 using the rotational force received from driving wheel 20 into direct current power based on signal PWM2 from MG-ECU 22, and provides the converted direct current power onto power supply line PL.

Motor generators MG1 and MG2 are 3-phase alternating current electric motors, formed of a 3-phase alternating current synchronous electric motor, for example. Motor generator MG1 generates 3-phase alternating current power using the motive energy of engine 16, and provides the generated 3-phase alternating current power to inverter 12. Motor generator MG1 generates motive power by the 3-phase alternating current power from inverter 12 to start engine 16. Motor generator MG2 generates the driving torque of driving wheel 20 by the 3-phase alternating current power received from inverter 14. In a vehicle regenerative braking mode, motor generator MG2 generates 3-phase alternating current power using the rotational force from driving wheel 20, and provides the generated 3-phase alternating current power to inverter 14.

Engine 16 is cranked by motor generator MG1 to be started. The throttle valve provided at the intake pipe, ignition device, injection device, and the like (all not shown) are operated to allow engine 16 to generate motive energy, based on a control signal CTL1 from engine ECU 24. Fuel tank 18 stores the fuel for engine 16. Fuel tank 18 has the fuel remaining amount FUEL detected by a sensor not shown. The detected fuel remaining amount FUEL is provided to HV-ECU 26.

AC/DC converter 28 is provided between battery B and terminals 40 and 42. AC/DC converter 28 responds to a control signal CTL2 from HV-ECU 26 to convert the electrical power from commercial power source 44 applied to terminals 40 and 42 to the voltage level of battery B for output thereto. Moreover, AC/DC converter 28 responds to control signal CTL2 from HV-ECU 26 to convert the electrical power from battery B to the voltage level of commercial power source 44 for output thereto.

Terminals 40 and 42 serve to connect commercial power source 44 to AC/DC converter 28. When battery B is charged from commercial power source 44, the commercial voltage of commercial power source 44 is applied to terminals 40 and 42. Voltage sensor 38 detects voltage VAC across terminals 40 and 42 to provide the detected voltage VAC to HV-ECU 26.

Auxiliary device 30 is connected to power supply line PL and ground line SL. Auxiliary device 30 receives the electrical power from power supply line PL to be driven based on a control signal CTL3 from HV-ECU 26. Auxiliary device 30 includes, for example, an electric air conditioner, a DC/DC converter, and the like. Power consumption PC of auxiliary device 30 is detected, which is provided to HV-ECU 26.

MG-ECU 22 receives from HV-ECU 26 a control command COMEG required to drive-control motor generators MG1 and MG2. MG-ECU 22 receives battery voltage VB and battery current IB from voltage sensor 36 and current sensor 37, respectively, and receives the detected value of motor current of motor generators MG1 and MG2 from a current sensor not shown. MG-ECU 22 generates a control signal PWM1 directed to drive inverter 12 and a control signal PWM2 directed to drive inverter 14, based on control command COMEG from HV-ECU 26 and respective detected values set forth above. Generated control signals PWM1 and PWM2 are provided to inverters 12 and 14, respectively.

Engine ECU 24 receives from HV-ECU 26 a control command COMEG required to drive-control engine 16. Engine ECU 24 generates a control signal CTL1 directed to drive engine 16, based on control command COMEG from HV-ECU 26. Generated control signal CTL1 is provided to engine 16.

HV-ECU 26 generates a control command COMEG required to drive-control motor generators MG1 and MG2. Generated control command COMEG is provided to MG-ECU 22. For example, HV-ECU 26 calculates the torque command of motor generators MG1 and MG2 based on the running state of the vehicle or the SOC of battery B to provide the calculated torque command to MG-ECU 22 as control command COMEG. HV-ECU 26 generates control command COMEG required to drive-control engine 16. Generated control command COMEG is output to engine ECU 24. For example, HV-ECU 26 calculates the rotational speed command of engine 16 based on the vehicle running state or the SOC of battery B to provide the calculated rotational speed command to engine ECU 24 as control command COMEG.

HV-ECU 26 receives battery voltage VB and battery current IB from voltage sensor 36 and current sensor 37, respectively, to calculate the SOC of battery B based on the received battery voltage VB and battery current IB. For example, the SOC can be calculated by accumulating battery current IB. Alternatively, the SOC can be calculated based on battery voltage VB using a map indicating the relationship between the open circuit voltage (OCV) of battery B and SOC. HV-ECU 26 controls the charge/discharge of battery B such that the calculated SOC is adjusted to be within a predetermined range (for example, in the range of ±20% about 60%).

When battery B is charged by commercial power source 44, HV-ECU 26 generates control signal CTL2 directed to drive AC/DC converter 28. Generated control signal CTL2 is output to AC/DC converter 28. The charging of battery B by means of commercial power source 44 can be designated, for example, by a user through input device 32, or executed at the time of refresh control of battery B, as will be described afterwards.

When determination is made that refresh of battery B is required and allowed, HV-ECU 26 executes refresh control by a method that will be described afterwards such that battery B is refresh-discharged, and then charged from commercial power source 44 using AC/DC converter 28 after execution of refresh-discharging.

Input device 32 is provided to allow the user to designate execution of refresh control, or allow the user to designate whether engine 16 is to be set in a backup operation mode as a preparation for electrical outage at commercial power source 44 during refresh control, as will be described afterwards. Input device 32 is formed of a touch panel, a button, or the like. Upon manipulation made by the user through input device 32, a signal corresponding to the manipulation is output to HV-ECU 26.

Notification device 34 notifies the user that battery B is currently charging/discharging in accordance with refresh control, or that engine 16 is currently in a backup operation mode as a preparation for electrical outage at commercial power source 44 during refresh control, as will be described afterwards. Notification device 34 may be a display device allowing visual confirmation by the user, or an audio device for notification by sound.

Figure 2:
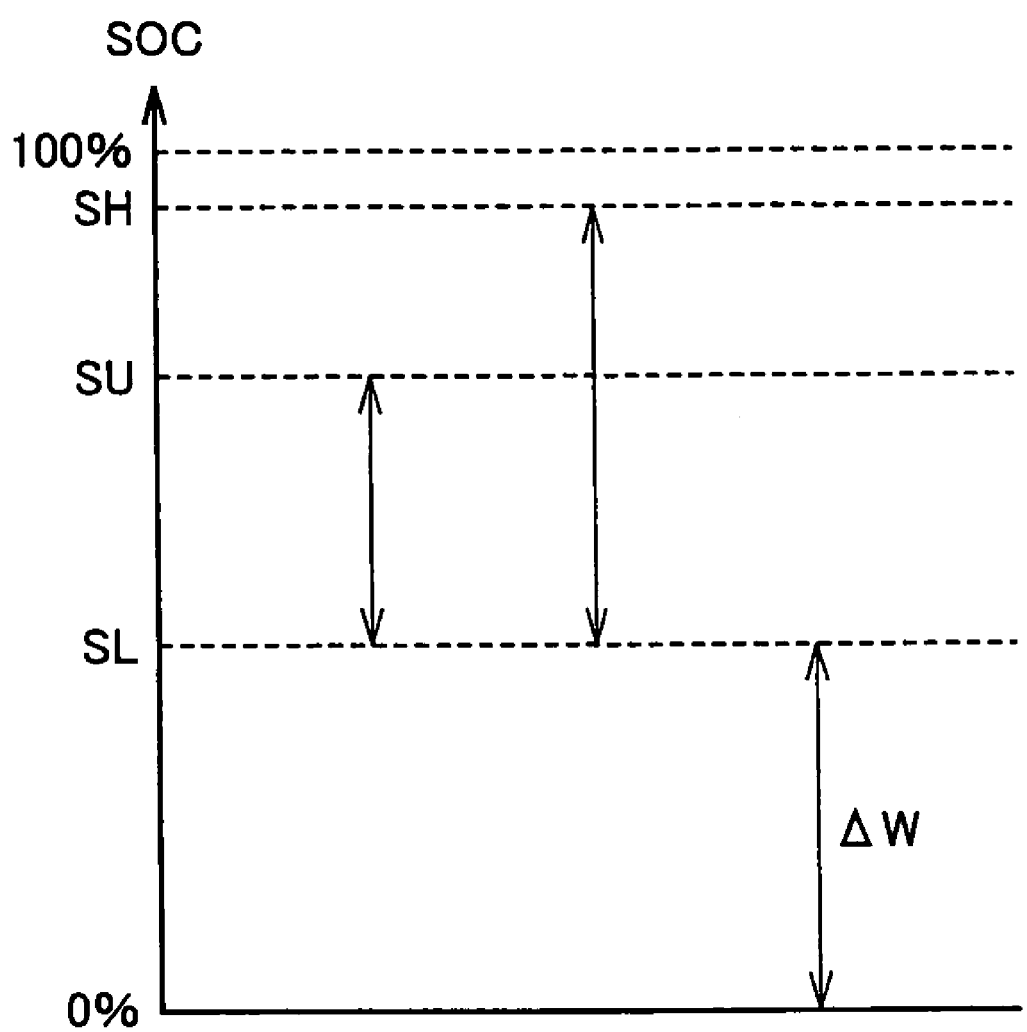
FIG. 2 is a diagram to describe the concept of refresh control of a battery by the HV-ECU shown in FIG. 1.

FIG. 2 is a diagram to describe the concept of refresh control of battery B by HV-ECU 26 of FIG. 1. Referring to FIG. 2, the vertical axis represents the SOC (%) of battery B. An upper limit SU and a lower limit SL define the control range of SOC. HV-ECU 26 controls SOC such that the SOC value is within this range. High upper limit SH represents the charge termination level when battery B is charged from commercial power source 44 using AC/DC converter 28.

In hybrid vehicle 10, the SOC will exceed upper limit SU since battery B can be charged from commercial power source 44 using AC/DC converter 28. In other words, hybrid vehicle 10 has a SOC control range higher than that of a hybrid vehicle absent of an external charging function.

Battery refresh is effective by the deviation of SOC from the general control range as much as possible. In hybrid vehicle 10 that has a high SOC control range, there is a possibility that battery B cannot be refreshed sufficiently by just setting battery B at a fully-charged state in the refresh operation of battery B. In this context, battery B is refreshed by discharging battery B, and then battery B is charged from commercial power source 44 by means of AC/DC converter 28 in the first embodiment.

In the charging operation of battery B, charging is executed, not by the electrical power generated by motor generator MG1 upon the drive of engine 16, but by means of commercial power source 44. Therefore, battery B is charged efficiently without degradation in mileage.

Figure 3:
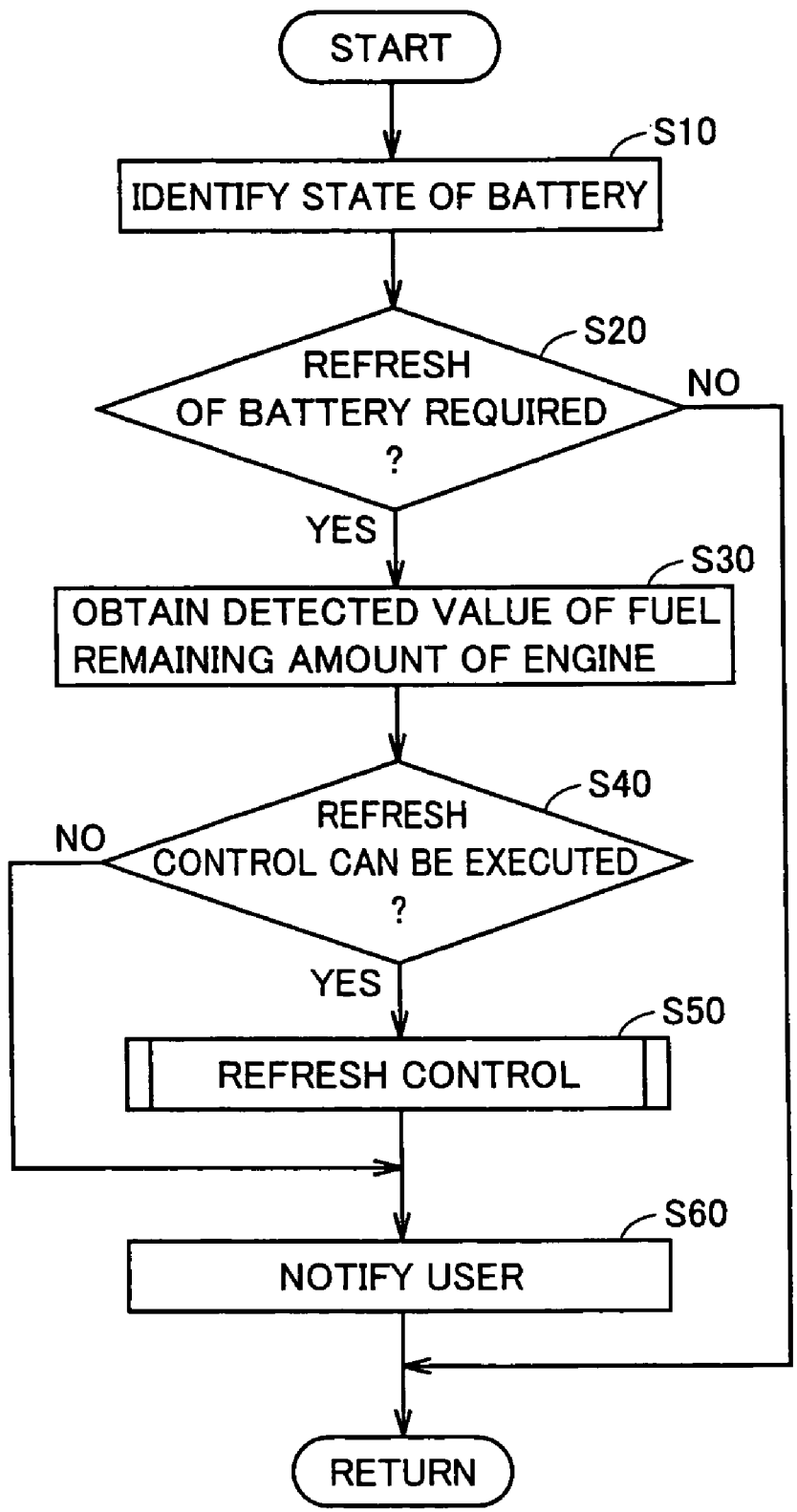
FIG. 3 is a flowchart of the control configuration of refresh control of a battery by the HV-ECU of FIG. 1.

FIG. 3 is a flowchart of the control configuration of refresh control of battery B by HV-ECU 26 of FIG. 1. The process in this flowchart is invoked from the main routine at a constant interval or every time a predetermined condition is satisfied to be executed.

Referring to FIG. 3, HV-ECU 26 first identifies the state of battery B (step S10). Specifically, HV-ECU 26 drives auxiliary device 30 at a predetermined standard state using the electrical power from battery B to estimate the actual SOC, by a method that will be described afterwards, and calculates the amount of deviation from the SOC, employed in SOC control, calculated based on battery voltage VB and battery current IB. HV-ECU 26 estimates the status of occurrence of memory effect at battery B based on the elapsed time from execution of the previous refresh control.

Figure 4:
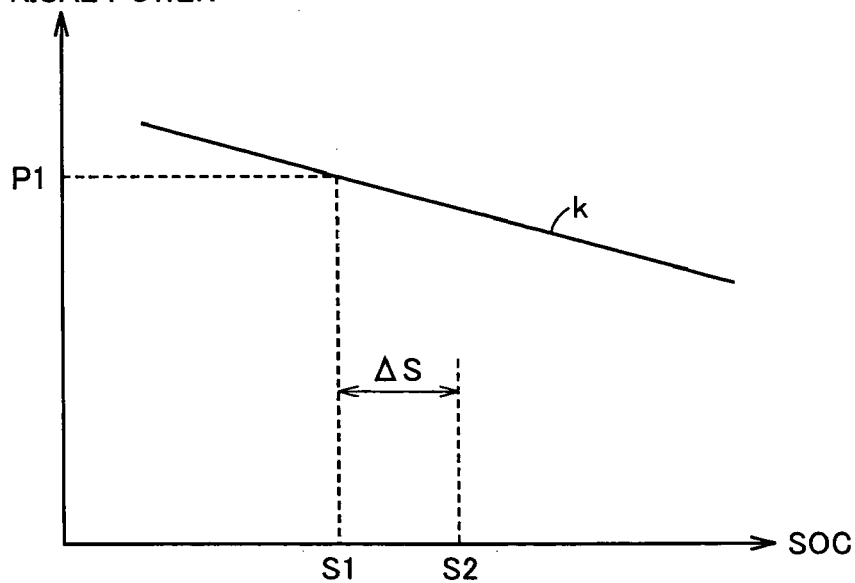
FIG. 4 is a diagram to describe the method of calculating the deviation amount of SOC using an auxiliary device.

FIG. 4 is a diagram to describe a method of calculating the SOC deviation amount using auxiliary device 30. Referring to FIG. 4, the horizontal axis represents the SOC of battery B, and the vertical axis represents the power consumption of auxiliary device 30. Line k1 represents the relationship between the power consumption of auxiliary device 30 and SOC when auxiliary device 30 is driven at a predetermined standard state using the electrical power from battery B. The relationship is established in a map based on data taken in advance.

The reason why power consumption of auxiliary device 30 increases as SOC becomes lower is due to the fact that the battery voltage becomes lower in proportion to a lower SOC, which in turn increases the current supplied to auxiliary device 30.

By measuring the power consumption of auxiliary device 30 when auxiliary device 30 is driven at a predetermined standard state using the electrical power from battery B, the actual SOC is estimated using the map. Specifically, P1 is taken as the power consumption of auxiliary device 30 when auxiliary device 30 is driven at a predetermined standard state using the electrical power from battery B, and S1 is taken as the actual SOC that is estimated. Further, S2 is taken as the SOC calculated based on battery voltage VB and battery current IB, employed in SOC control. HV-ECU 26 calculates the difference ΔS between S1 and S2 as the SOC deviation amount.

Referring to FIG. 3 again, HV-ECU 26 determines whether refresh of battery B is required or not based on the identified state of battery B (step S20). Specifically, HV-ECU 26 determines that battery B must be refreshed in the case where the SOC deviation amount exceeds a threshold value that is set in advance, or in the case where the elapsed time from execution of the previous refresh control exceeds a prescribed time that is set in advance, leading to the presumption that memory effect has occurred.

When HV-ECU 26 determines that refresh of battery B is not required (NO at step S20), control returns to the main routine without carrying out the subsequent series of processes. In contrast, when HV-ECU 26 determines that refresh of battery B is required (YES at step S20), fuel remaining amount FUEL of engine 16 detected at fuel tank 18 is obtained (step S30). Then, HV-ECU 26 determines whether execution of refresh control of battery B is allowed or not based on the obtained fuel remaining amount FUEL (step S40). Specifically, HV-ECU 26 determines that refresh control of battery B is not to be executed when fuel remaining amount FUEL is lower than a threshold value set in advance. This threshold value corresponds to the remaining amount of fuel that allows engine 16 to be operated continuously during the period when SOC is lower than the lowest amount that can ensure the electrical power required to start engine 16 by motor generator MG1 in a refresh control operation.

Figure 5:
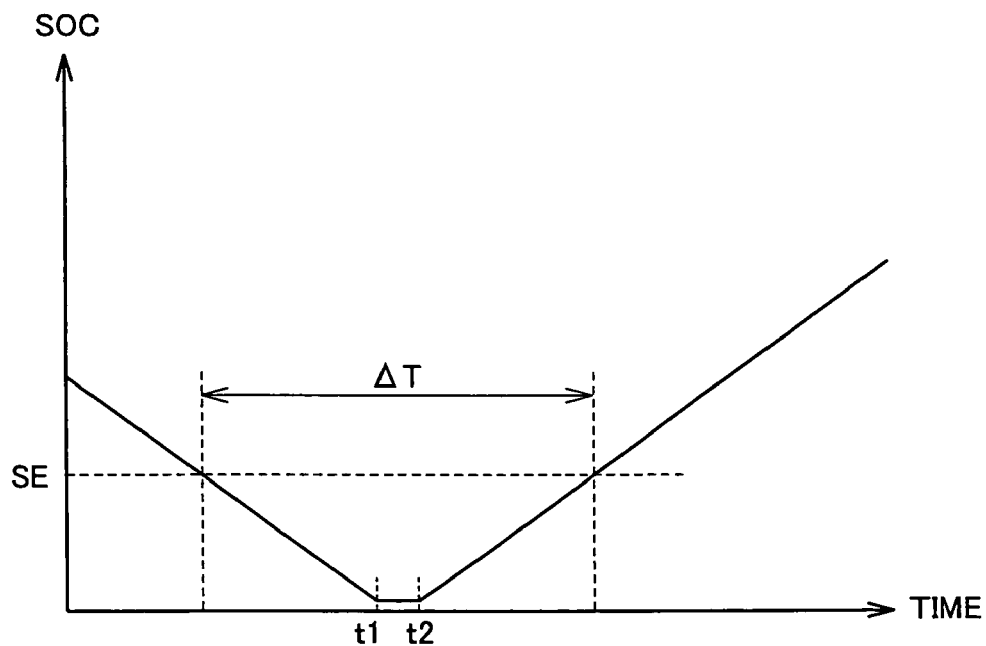
FIG. 5 represents the change in SOC during refresh control.

FIG. 5 represents the change in SOC in a refresh control operation. Referring to FIG. 5, the vertical axis represents the SOC of battery B, and the horizontal axis represents the elapsed time. Prior to time t1, refresh control of battery B is initiated, and refresh-discharging is completed at time t1. The SOC calculated-value (SOC calculated value used in SOC control) is reset during the period of time t1 to t2. Charging of battery B is initiated at time t2.

As used herein, value SE represents the lowest level that allows engine 16 to be started based on the drive of motor generator MG1 using the electrical power from battery B. Specifically, if SOC is lower than value SE, engine 16 cannot be started by the drive of motor generator MG1. Therefore, if commercial power source 44 fails in a period ΔT during which SOC is lower than value SE, engine 16, if stopped, cannot be started. Moreover, the vehicle cannot be made to move since the SOC is low.

In the first embodiment, engine 16 is set in a backup operation mode as a preparation for electrical outage at commercial power source 44 in period ΔT during which SOC is lower than value SE. Thus, the remaining amount of fuel that allows engine 16 to be operated continuously during this period ΔT is set as the threshold value, and refresh control of battery B is not to be executed when fuel remaining amount FUEL is lower than this threshold value.

Referring to FIG. 3 again, when determination is made that execution of refresh control is allowed at step S40 (YES at step S40), HV-ECU 26 actually executes refresh control (step S50). The details of this refresh control will be described afterwards. HV-ECU 26 outputs to notification device 34 a signal indicating that refresh control is currently executed. The user is notified that battery B is currently charging/discharging in accordance with refresh control by notification device 34 (step S60).

When determination is made that execution of refresh control is not allowed at step S40 (NO at step S40), HV-ECU 26 proceeds to step S60. HV-ECU 26 outputs to notification device 34 a signal indicating that determination has been made that execution of refresh control is not allowed. The user is notified accordingly through notification device 34.

Figure 6:
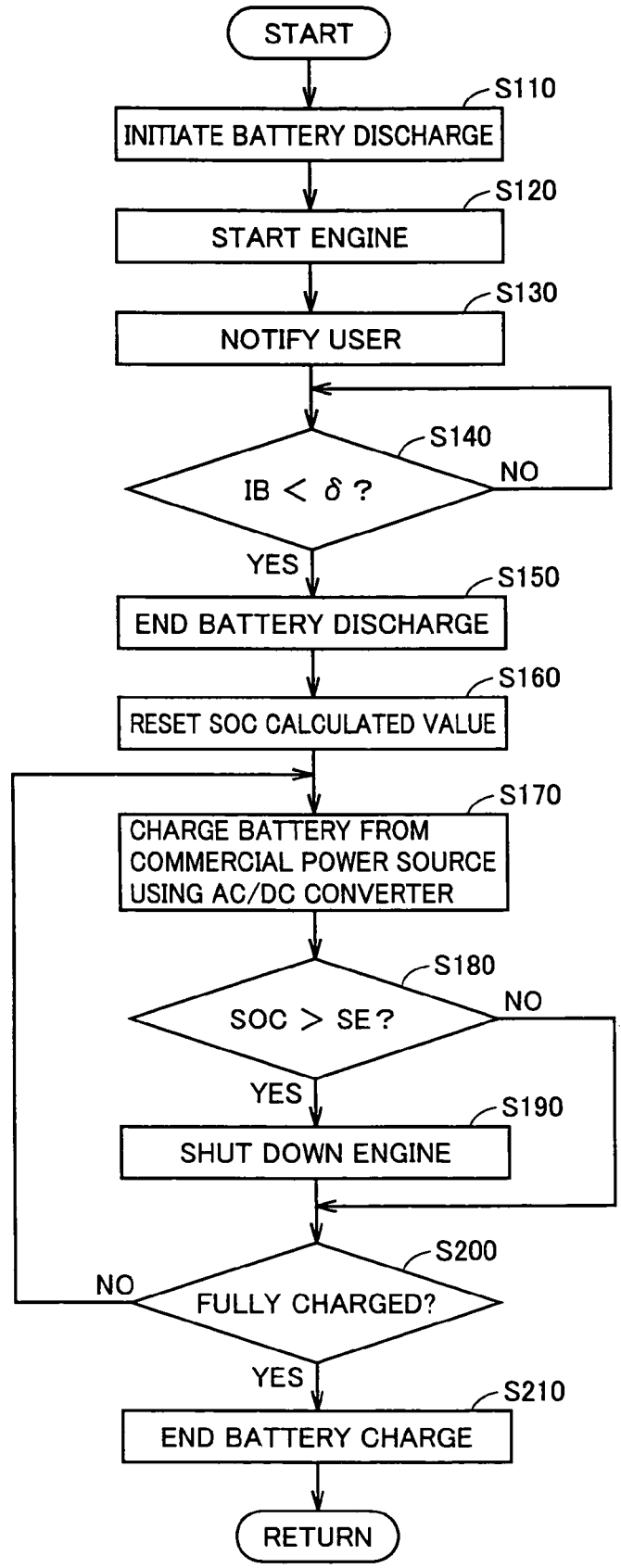
FIG. 6 is a detailed flowchart of the process of step S50 shown in FIG. 5.

FIG. 6 is a flowchart of the details of the process of step S50 shown in FIG. 5. Referring to FIG. 6, HV-ECU 26 initiates the discharge of battery B (step S110). Specifically, HV-ECU 26 provides a control signal CTL3 to auxiliary device 30. In response, auxiliary device 30 is driven such that the electrical power stored in battery B is consumed by auxiliary device 30.

When discharging of battery B is initiated, HV-ECU 26 provides a control command COMEG directed to drive motor generator MG1 to MG-ECU 22. In response, inverter 12 is driven by MG-ECU 22, and startup of engine 16 is effected by motor generator MG1 (step S120). Startup of engine 16 is effected at least before SOC becomes lower than the aforementioned value SE that allows startup of engine 16 by the drive of motor generator MG1 using the electrical power from battery B.

When engine 16 is started, HV-ECU 26 outputs to notification device 34 a signal indicating that engine 16 has been started. Notification device 34 notifies the user that engine 16 is in a backup operation mode in accordance with refresh control (step S130).

During the discharge of battery B, HV-ECU 26 monitors battery current IB from current sensor 37 to determine whether battery current IB becomes lower than a threshold value δ (step S140). This threshold value δ is set to a sufficiently low value. Determination is made that battery B has been discharged sufficiently when battery current IB becomes lower than threshold value δ. When HV-ECU 26 determines that battery current IB has become lower than threshold value δ (YES at step S140), auxiliary device 30 is shut down and discharging of battery B ends (step S150). Then, HV-ECU 26 resets the SOC calculated value (SOC calculated value employed in SOC control) to a prescribed value (step 160). This prescribed value may be 0%, or an offset value corresponding to threshold value δ.

Upon reset of the SOC calculated value, HV-ECU 26 outputs control signal CTL2 to AC/DC converter 28 to drive the same. Battery B is charged by commercial power source 44 (step S170). Then, HV-ECU 26 determines whether the SOC of battery B exceeds the aforementioned value SE (step S180). When HV-ECU 26 determines that the SOC exceeds value SE (YES at step S180), engine 16 is shut down (step S190) since an SOC level that allows startup of engine 16 even in the event of electrical outage at commercial power source 44 is ensured. When the SOC is equal to or lower than value SE (NO at step S180), HV-ECU 26 proceeds to step S200.

Then, HV-ECU 26 determines whether battery B has attained a fully-charged state or not (step S200) based on whether SOC has exceeded the high upper limit SH indicating the charge termination level of battery B. When HV-ECU 26 determines that battery B has not yet attained a fully-charged state (NO at step S200), control returns to step S170 to continue charging of battery B.

When determination is made that battery B has attained a fully-charged state at step S200 (YES at step S200), HV-ECU 26 stops AC/DC converter 28, and charging of battery B ends (step S210).

The backup operation of engine 16 during refresh control is restricted to be carried out only in the period during which the SOC is low. Moreover, power generation load is not exerted. Therefore, the fuel consumption is lower as compared to the case where engine 16 is driven to charge battery B.

The above description is based on a configuration in which battery B is discharged by driving auxiliary device 30 such that electrical power of battery B is consumed at auxiliary device 30. Alternatively, battery B may be discharged by power consumption of the coil of motor generator MG1 (or MG2) or discharge resistor (not shown).

Moreover, HV-ECU 26 may drive AC/DC converter 28 to provide the electrical power of battery B to commercial power source 44 for the purpose of discharging battery B. This allows battery B to be discharged without wasting electrical power. In this case, the advantage in cost is increased by executing refresh control during the midnight power time zone.

Although the above embodiment has been described in which determination is made as to whether refresh control is to be executed or not based on fuel remaining amount FUEL of engine 16, this determination may be made based on a signal from input device 32. Namely, the user can designate whether execution of refresh control is allowed or not through input device 32. Accordingly, the convenience for the user is improved.

The above description is based on a configuration in which engine 16 is started upon initiation of the discharge of battery B. Determination of whether engine 16 can be started or nor may be made based on a signal from input device 32. Namely, the user can designate through input device 32 whether engine 16 is to be set in a backup operation mode during the discharge of battery B. Accordingly, the convenience for the user is improved.

Since battery B can be charged from commercial power source 44 using AC/DC converter 28 in the first embodiment, the SOC control region is higher than that of a hybrid vehicle absent of an external charging function. In view of the possibility that a sufficient refresh effect cannot be achieved by simply carrying out refresh-charging, refresh-discharging of battery B is executed prior to the charge of battery B from commercial power source 44 using AC/DC converter 28 in the first embodiment. Thus, battery B can be refreshed reliably. Since HV-ECU 26 drives AC/DC converter 28 such that battery B is charged from commercial power source 44 after battery B has been subjected to refresh-discharge, battery B can be charged more efficiently than in the case where battery B is charged upon driving engine 16. According to the first embodiment, battery B can be refreshed reliably and efficiently.

Since engine 16 is set in a backup operation mode during refresh control, the event of the vehicle being disabled in movement can be prevented even if commercial power source 44 fails when the SOC is low in accordance with refresh-discharging.

Furthermore, since determination is made as to whether refresh control is to be executed or not based on the remaining amount of fuel at engine 16, engine 16 will not be brought to a stall as a result of running out of gas during refresh control. Therefore, standstill of the vehicle can be reliably prevented even when commercial power source 44 fails when the SOC is low in accordance with refresh-discharging.

Further, the safety during refresh control can be ensured since the user is notified, by means of notification device 34, of battery B being currently charged/discharged in accordance with refresh-discharging, and of a backup operation mode of engine 16.

Since battery B can be charged from commercial power source 44 using AC/DC converter 28 in the first embodiment, there will be more occasions of running by motor generator MG2 alone using the electrical power from battery B with engine 16 stopped. In view of the possibility of the engine being degraded if left for a long period of time immobilized, engine 16 is operated in accordance with refresh control. Therefore, degradation of engine 16 can be prevented in the first embodiment.

Second Embodiment

In the first embodiment, determination is made as to whether refresh control is to be executed or not based on the remaining amount of fuel of engine 16. This is in view of the possibility that commercial power source 44 may fail during refresh control. In the present second embodiment, determination is made as to whether refresh control is to be executed or not based on the stability of commercial power source 44. Namely, refresh control is executed upon determination that commercial power source 44 will not fail during refresh-discharge if commercial power source 44 is stable.

The entire configuration of a hybrid vehicle 10A according to the second embodiment is similar to that of hybrid vehicle 10 according to the first embodiment shown in FIG. 1.

Figure 7:
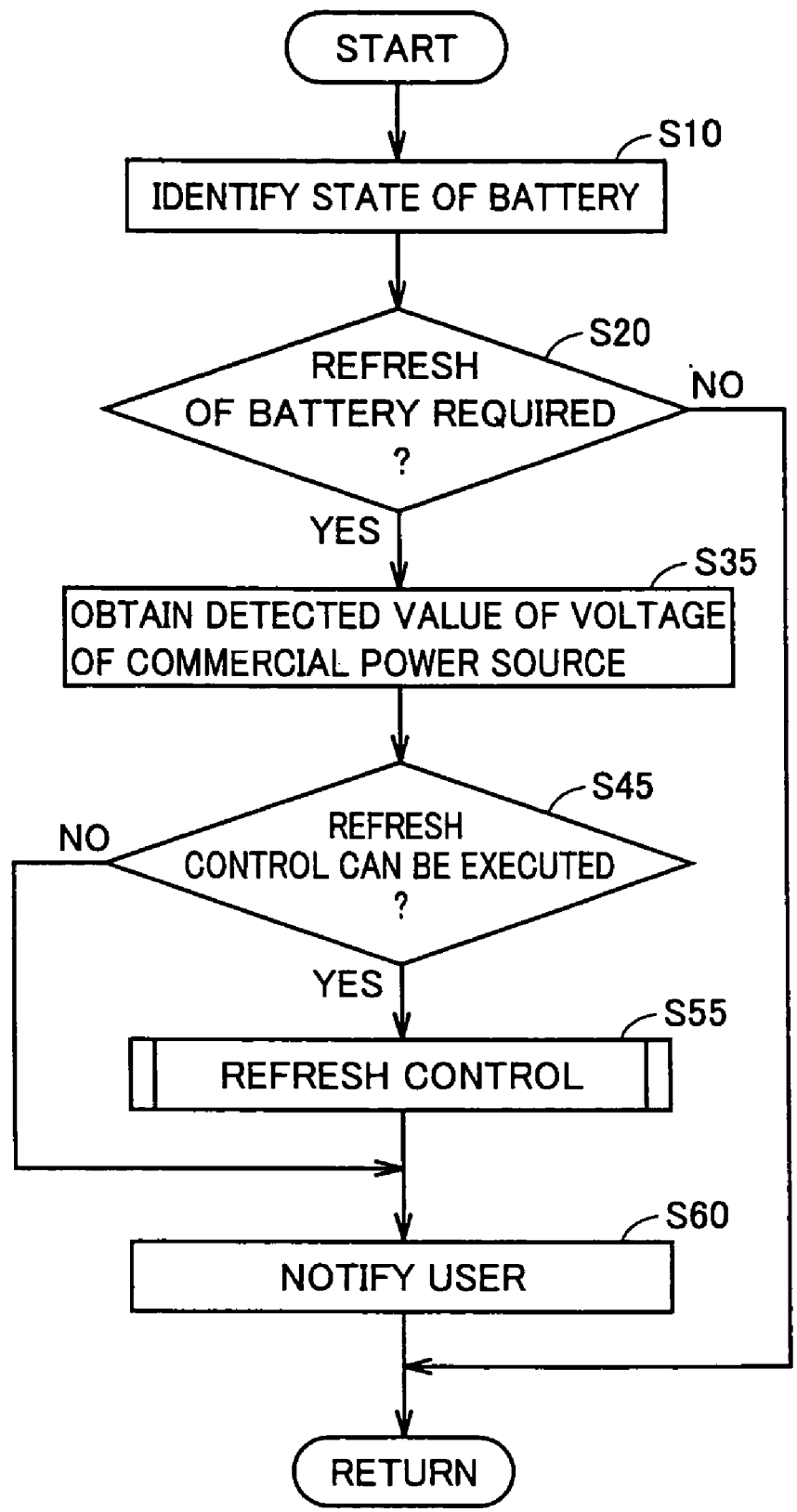
FIG. 7 is a flowchart of the control configuration of refresh control of a battery by the HV-ECU according to a second embodiment.

FIG. 7 is a flowchart of the control configuration of refresh control of battery B by an HV-ECU 26A according to the second embodiment. The process of this flowchart is invoked from the main routine to be executed at a predetermined time interval or every time a predetermined condition is satisfied.

The flowchart of FIG. 7 includes steps S35, S45 and S55 instead of steps S30, S40, and S50, respectively, in the flowchart of FIG. 3. Specifically, when determination is made that refresh is required for battery B at step S20 (YES at step S20), HV-ECU 26A obtains voltage VAC of commercial power source 44 detected by voltage sensor 38 (step S35).

HV-ECU 26A determines whether execution of refresh control of battery B is allowed or not based on the obtained voltage VAC (step S45). Specifically, HV-ECU 26A determines the stability of commercial power source 44 based on the level of voltage VAC, the frequency, and the like. For example, when voltage VAC is reduced or frequency variation observed, HV-ECU 26A determines that commercial power source 44 is unstable. HV-ECU 26A determines that refresh control of battery B is not to be executed upon determination of commercial power source 44 being unstable.

When determination is made that refresh control can be executed at step S45 (YES at step S45), HV-ECU 26A actually executes refresh control (step S55). When determination is made that refresh control cannot be executed at step S45 (NO at step S45), HV-ECU 26A proceeds to the process of step S60.

The process of refresh control at step S55 corresponds to the process of the flowchart of FIG. 6, absent of steps S120, S130, S180 and S190. In other words, the refresh control process is constituted of the series of processes with the process related to startup and stop of engine 16 removed in the flowchart of FIG. 6.

Since determination is made as to whether refresh control is to be executed or not based on the stability of commercial power source 44 in the second embodiment, the possibility of commercial power source 44 failing during refresh control is low. Therefore, the risk of the vehicle being disabled in movement as a result of failure of commercial power source 44 when the SOC is low in accordance with refresh-discharging can be reduced.

Modification of Second Embodiment

The second embodiment has been described based on a configuration in which determination of whether refresh control is to be executed out or not is made based on the stability of commercial power source 44. In the present modification, determination as to whether engine 16 is to be set in a backup operation mode during refresh control is made based on the stability of commercial power source 44.

When determination is made that refresh is required of battery B in the modification of the second embodiment, refresh control is executed independent of the stability of commercial power source 44.

Figure 8:
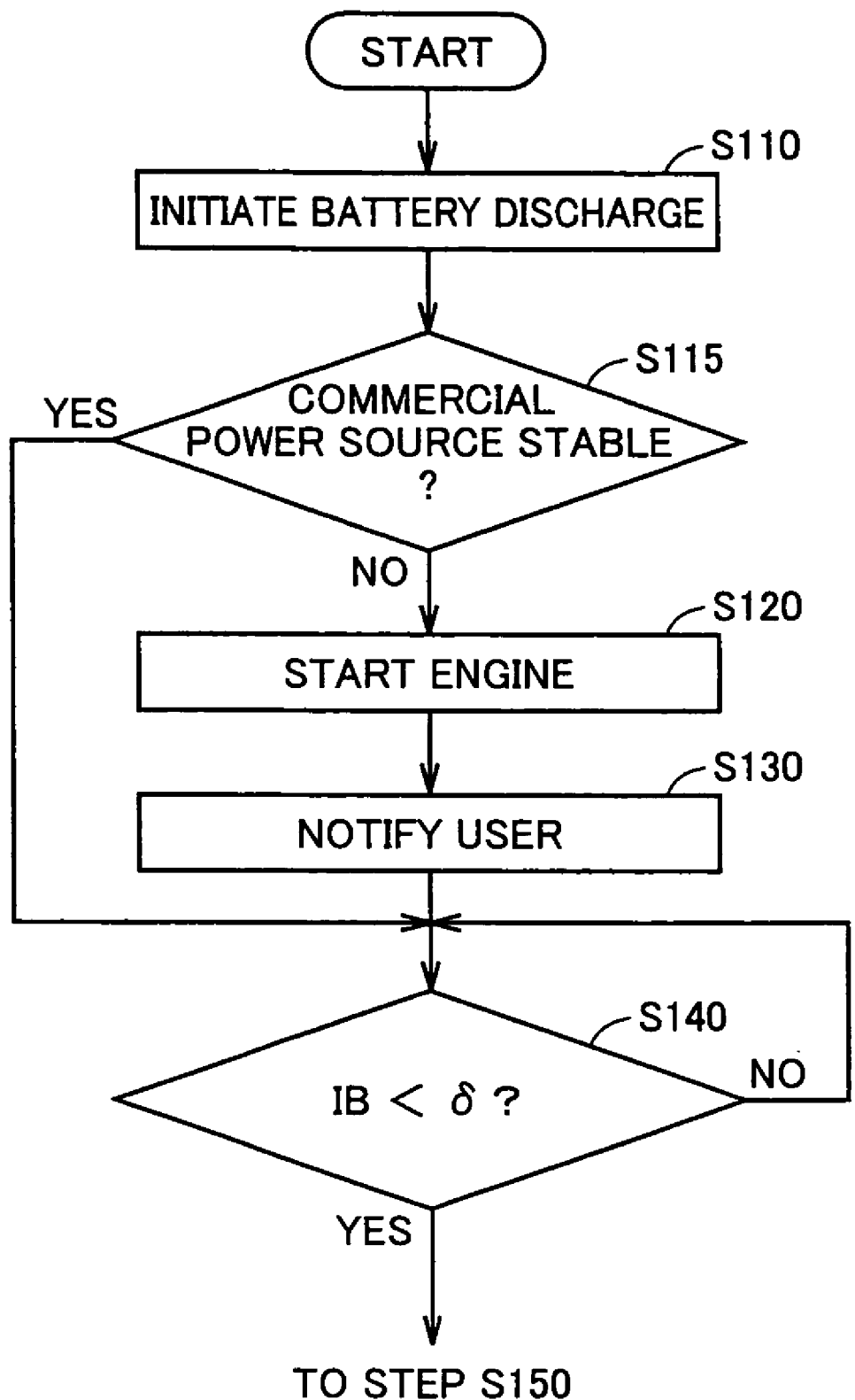
FIG. 8 is a flowchart of refresh control according to a modification of the second embodiment.

FIG. 8 is a flowchart of refresh control according to the modification of the second embodiment. The flowchart of FIG. 8 further includes an addition step S115 in the flowchart of FIG. 6. Specifically, when discharge of batter B is initiated at step S110, HV-ECU 26A determines the stability of commercial power source 44 based on voltage VAC from voltage sensor 38 (step S115). Determination of the stability of commercial power source 44 is made in a manner similar to that of step S45 of FIG. 7.

When determination is made that commercial power source 44 is unstable (NO at step S115), HV-ECU 26A proceeds to step S120 to start engine 16 (step S120). In other words, engine 16 is operated for backup as a preparation for failure at commercial power source 44 when commercial power source 44 is unstable.

When determination is made that commercial power source 44 is stable at step S115 (YES at step S115), HV-ECU 26A proceeds to step S140. Specifically, determination is made that commercial power source 44 will not fail, and backup operation of engine 16 is not executed when commercial power source 44 is stable.

The steps subsequent to step S150 are similar to those of the flowchart of FIG. 6.

Since determination is made as to whether engine 16 is to be set in a backup operation mode during refresh control based on the stability of commercial power source 44 in the modification of the second embodiment, engine 16 will not be driven in a backup operation mode when the possibility of failure of commercial power source 44 is low. Therefore, an unnecessary operation of engine 16 for backup can be obviated.

In the second embodiment and modification thereof set forth above, determination of whether refresh control is to be executed or not and determination of whether backup operation is to be executed or not are made based on the stability of commercial power source 44. Alternatively, such determinations can be made based on predetermined date information. For example, at the summer season or at noon time, execution of refresh control may be suppressed since the possibility of electrical outage is high in view of the power peak. Moreover, execution of backup operation of engine 16 can be suppressed during nighttime hours in view of the problem of noise.

In each of the embodiments set forth above, hybrid vehicles 10 and 10A may be based on a series/parallel type configuration that allows the motive energy of engine 16 to be divided to the axle and motor generator MG1 by a power split mechanism for transmission, or a series type configuration in which engine 16 is used only for the purpose of driving motor generator MG1, and the driving force of axle is developed by motor generator MG2 alone using the electrical power generated by motor generator MG1.

The above description is based on a configuration in which battery B is charged from commercial power source 44. Alternatively, battery B may be charged by another power source, for example a solar cell, instead of commercial power source 44.

Although the above embodiments have been described in which AC/DC converter 28 is installed in the vehicle, AC/DC converter 28 may be installed outside the vehicle.

The above description is based on a configuration in which battery B is charged from commercial power source 44 using AC/DC converter 28. Alternatively, the electrical power from commercial power source 44 may be supplied to the neutral point of each of the 3-phase coils of motor generators MG1 and MG2 to charge battery B under switching control such that inverters 10 and 20 are operated as respective phase arms of single-phase PWM converters. By employing this method, AC/DC converter 28 is dispensable.

In the description set forth above, engine 16 corresponds to "internal combustion engine" of the present invention, and motor generator MG2 corresponds to "first electric motor" of the present invention. Battery B corresponds to "battery" in the present invention. Motor generator MG1 corresponds to "power generation device" and "second electric motor" of the present invention. Further, AC/DC converter 28 corresponds to "electrical power conversion device" of the present invention. HV-ECUs 26 and 26A correspond to "control device" of the present invention.

It will be understood that the embodiments disclosed herein are by way of example only, and is not to be taken by way of limitation in all aspects. The scope of the present invention is defined, not by the description set forth above, but by the appended claims, and all changes that fall within limits and bounds of the claims, or equivalence thereof are intended to be embraced by the claims.

The invention claimed is:

1. A hybrid vehicle comprising:
an internal combustion engine and a first electric motor incorporated as a motive energy source for a vehicle,
a battery that can be charged and discharged, constituting a power source for said first electric motor,
a power generation device generating electrical power using motive energy from said internal combustion engine, and capable of charging said battery,
an electrical power conversion device conducting electrical power conversion such that electrical power can be transmitted and received between a power source external to the vehicle and said battery, and
a control device controlling said electrical power conversion device such that refresh-discharging of said battery is executed before said battery is charged from said external power source using said electrical power conversion device, and said battery is charged from said external power source after said battery is refresh-discharged, wherein
said power generation device includes a second electric motor having a rotational shaft mechanically coupled to a crankshaft of said internal combustion engine,
said second electric motor can start said internal combustion engine using electrical power from said battery,
said control device determines that said refresh-discharging is to be executed when a fuel remaining amount of said internal combustion engine exceeds a prescribed amount, and
said prescribed amount corresponds to an amount that allows said internal combustion engine to be operated continuously during a period when a state of charge indicating a charge state of said battery is lower than a required amount required to start said internal combustion engine by said second electric motor in accordance with said refresh-discharging.

2. The hybrid vehicle according to claim 1, wherein said control device controls said second electric motor such that said internal combustion engine is started before said state of charge becomes lower than said required amount in accordance with said refresh-discharging, and controls said internal combustion engine such that said internal combustion engine is operated continuously during the period when said state of charge is lower than said required amount.

3. The hybrid vehicle according to claim 1, wherein said control device determines whether said external power source is stable or not, and determines that said refresh-discharging is to be executed independent of said fuel remaining amount when determination is made that said external power source is stable.

4. The hybrid vehicle according to claim 1, further comprising an input device for a user to designate execution of said refresh-discharging,
wherein said control device determines that said refresh-discharging is to be executed when execution of said refresh-discharging is designated through said input device.

5. The hybrid vehicle according to claim 1, wherein said control device controls said electrical power conversion device such that electrical power discharged from said battery is supplied to said external power source.

6. The hybrid vehicle according to claim 1, further comprising a notification device notifying a user that said battery is currently charging/discharging in accordance with said refresh-discharging.

7. The hybrid vehicle according to claim 1, further comprising a notification device notifying a user that said internal combustion engine is currently operating in accordance with said refresh-discharging.

8. A hybrid vehicle comprising:
an internal combustion engine and a first electric motor incorporated as a motive energy source for a vehicle,
a battery that can be charged and discharged, constituting a power source for said first electric motor, a power generation device generating electrical power using motive energy from said internal combustion engine, and capable of charging said battery, an electrical power conversion device conducting electrical power conversion such that electrical power can be transmitted and received between a power source external to the vehicle and said battery, and a control device controlling said electrical power conversion device such that refresh-discharging of said battery is executed before said battery is charged from said external power source using said electrical power conversion device, and said battery is charged from said external power source after said battery is refresh-discharged, wherein said power generation device includes a second electric motor having a rotational shaft mechanically coupled to a crankshaft of said internal combustion engine, said second electric motor can start said internal combustion engine using electrical power from said battery, and said control device determines whether said external power source is stable or not, and controls said second electric motor such that said internal combustion engine is started when determination is made that said external power source is unstable.

9. A hybrid vehicle comprising:

an internal combustion engine and a first electric motor incorporated as a motive energy source for a vehicle, a battery that can be charged and discharged, constituting a power source for said first electric motor, a power generation device generating electrical power using motive energy from said internal combustion engine, and capable of charging said battery, an electrical power conversion device conducting electrical power conversion such that electrical power can be transmitted and received between a power source external to the vehicle and said battery, a control device controlling said electrical power conversion device such that refresh-discharging of said battery is executed before said battery is charged from said external power source using said electrical power conversion device, and said battery is charged from said external power source after said battery is refresh-discharged, and an input device for a user to designate whether said internal combustion engine is to be operated or not in accordance with said refresh-discharging, wherein said power generation device includes a second electric motor having a rotational shaft mechanically coupled to a crankshaft of said internal combustion engine, said second electric motor can start said internal combustion engine using electrical power from said battery, and said control device controls said second electric motor such that said internal combustion engine is started in accordance with said refresh-discharging when operation of said internal combustion engine is designated through said input device.

10. A control method for a hybrid vehicle, said hybrid vehicle including an internal combustion engine and a first electric motor incorporated as a motive energy source for a vehicle, a battery that can be charged and discharged, constituting a power source for said first electric motor, a power generation device generating electrical power using motive energy from said internal combustion engine, and capable of charging said battery, and an electrical power conversion device conducting electrical power conversion such that electrical power can be transmitted and received between a power source external to the vehicle and said battery, wherein said power generation device includes a second electric motor having a rotational shaft mechanically coupled to a crankshaft of said internal combustion engine, said second electric motor can start said internal combustion engine using electrical power from said battery, said control method comprising:

a first step of executing refresh-discharging of said battery before said battery is charged from said external power source using said electrical power conversion device, a second step of charging said battery from said external power source by controlling said electrical power conversion device, after said battery is refresh-discharged, and a third step of determining whether said refresh-discharging is to be executed or not based on a fuel remaining amount of said internal combustion engine, wherein said refresh-discharging of said battery is executed at said first step when determination is made that said refresh-discharging is to be executed based on the fuel remaining amount of said internal combustion engine exceeding a prescribed amount at said third step, and said prescribed amount corresponds to an amount that allows said internal combustion engine to be operated continuously during a period when a state of charge indicating a charge state of said battery is lower than a required amount required to start said internal combustion engine by said second electric motor in accordance with said refresh-discharging.

11. The control method for a hybrid vehicle according to claim 10, further comprising:

a fourth step of starting said internal combustion engine before said state of charge becomes lower than said required amount in accordance with said refresh-discharging, and a fifth step of shutting down said internal combustion engine when said state of charge exceeds said required amount in the event of said battery being charged from said external power source at said second step.

12. The control method for a hybrid vehicle according to claim 10, further comprising a sixth step of determining whether said refresh-discharging is to be executed or not based on said external power source, wherein said refresh-discharging of said battery is executed at said first step independent of said fuel remaining amount, when determination is made that said refresh-discharging is to be executed based on said external power source being stable at said sixth step.

13. A control method for a hybrid vehicle, said hybrid vehicle including an internal combustion engine and a first electric motor incorporated as a motive energy source for a vehicle, a battery that can be charged and discharged constituting a power source for said first electric motor, a power generation device generating electrical power using motive energy from said internal combustion engine, and capable of charging said battery, and an electrical power conversion device conducting electrical power conversion such that electrical power can be transmitted and received between a power source external to the vehicle and said battery, wherein said power generation device includes a second electric motor having a rotational shaft mechanically coupled to a crankshaft of said internal combustion engine, said second electric motor can start said internal combustion engine using electrical power from said battery, said control method comprising the steps of:
executing refresh-discharging of said battery before said battery is charged from said external power source using said electrical power conversion device,
charging said battery from said external power source by controlling said electrical power conversion device, after said battery is refresh-discharged, determining whether said external power source is stable or not, and
starting said internal combustion engine when determination is made that said external power source is unstable.

* * * * *